US008650574B2

(12) United States Patent
Breiter et al.

(10) Patent No.: US 8,650,574 B2
(45) Date of Patent: Feb. 11, 2014

(54) METHOD AND SYSTEM FOR DYNAMICALLY CREATING AND MODIFYING RESOURCE TOPOLOGIES AND EXECUTING SYSTEMS MANAGEMENT FLOWS

(75) Inventors: Gerd Breiter, Wilderg (DE); Ruediger Maass, Boeblingen (DE); Steffen Rost, Nafringen (DE); Thomas Spatzier, Schoeuaich (DE)

(73) Assignee: International Business Machines Corporation, Armonk, NY (US)

( * ) Notice: Subject to any disclaimer, the term of this patent is extended or adjusted under 35 U.S.C. 154(b) by 2044 days.

(21) Appl. No.: 11/428,725

(22) Filed: Jul. 5, 2006

(65) Prior Publication Data

US 2008/0201715 A1    Aug. 21, 2008

(51) Int. Cl.
*G06F 9/46*    (2006.01)

(52) U.S. Cl.
USPC ........................................... 718/104

(58) Field of Classification Search
None
See application file for complete search history.

(56) References Cited

U.S. PATENT DOCUMENTS

| | | | |
|---|---|---|---|
| 5,568,605 A * | 10/1996 | Clouston et al. | 714/4 |
| 6,058,413 A | 5/2000 | Flores et al. | |
| 6,058,426 A | 5/2000 | Godwin et al. | |
| 6,112,243 A | 8/2000 | Downs et al. | |
| 6,868,448 B1 | 3/2005 | Gupta et al. | |
| 6,901,440 B1 | 5/2005 | Bimm et al. | |
| 7,167,821 B2 * | 1/2007 | Hardwick et al. | 703/22 |
| 7,644,410 B1 * | 1/2010 | Graupner et al. | 718/104 |
| 7,685,283 B2 | 3/2010 | Boyce, Jr. et al. | |
| 7,711,813 B1 | 5/2010 | Yehuda et al. | |
| 7,778,888 B2 | 8/2010 | Daur et al. | |
| 2002/0194251 A1 | 12/2002 | Richter et al. | |
| 2004/0064558 A1 | 4/2004 | Miyake | |
| 2004/0122983 A1 * | 6/2004 | Speed et al. | 710/1 |
| 2005/0131773 A1 * | 6/2005 | Daur et al. | 705/26 |
| 2005/0154735 A1 | 7/2005 | Breh et al. | |
| 2008/0052718 A1 | 2/2008 | Hundscheidt | |
| 2008/0201715 A1 | 8/2008 | Breiter et al. | |
| 2008/0319857 A1 | 12/2008 | Dobbins et al. | |

OTHER PUBLICATIONS

U.S. Appl. No. 11/556,728 Non Final Office Action Mailed Dec. 9, 2010.

* cited by examiner

*Primary Examiner* — Gregory A Kessler
(74) *Attorney, Agent, or Firm* — Cantor Colburn LLP; William A. Kinnaman, Jr.

(57) ABSTRACT

The present invention replaces the prior art Systems Management Flow execution environments with a new Order Processing Environment. The Order Processing Environment consists of an Order Processing Container ("Container" in short), a Relationship Registry, and a Factory Registry. The Factory Registry supports creation of new resource instances. The Relationship Registry stores relationships between resources. The Container gets as input an Order and a start point address for the first resource. The Order is a document (e.g., XML) which includes a number of Tasks for each involved resource without arranging those tasks in a sequence. This differentiates Orders from workflow descriptions used by standard workflow engines. Each Task includes at least all input parameters for executing the Task. The sequence of the Task execution is derived by the Container by using the Relationship Registry which reflects all current Resource Topologies.

11 Claims, 11 Drawing Sheets

METHOD AND SYSTEM FOR DYNAMICALLY CREATING AND MODIFYING RESOURCE TOPOLOGIES AND EXECUTING SYSTEMS MANAGEMENT FLOWS

CROSS-REFERENCE TO RELATED APPLICATION

This application is related to the commonly owned, concurrently filed application, Ser. No. 11/428,717, entitled "METHOD AND SYSTEM FOR TRANSFORMING ORDERS FOR EXECUTING THEM IN STANDARD WORKFLOW ENGINES", and incorporated herein by reference.

TECHNICAL FIELD OF THE INVENTION

The present invention relates to the field of systems management of IT infrastructures and in more particular to a method and system for dynamically creating and modifying resource topologies and executing systems management flows.

BACKGROUND ART

Today's IT infrastructures are composed of a large number of heterogeneous, distributed stateful IT resources (see also layer "IT Resources" in FIG. 1). That is, IT services typically comprise or are hosted by several heterogeneous IT resources (e.g. servers, operating systems on those servers, databases, application server software, etc.). We use the term IT Service Environment for a collection of resources and a set of behavioral conditions that all together define a specific IT service. IT services may be part of outsourcing agreements of IT services providers with customers, or they may be in-house applications.

For each of the resources used by IT Services several resource-specific management functions are available for controlling the operation of a resource, i.e. for creating (provisioning), destroying (de-provisioning) and controlling the operation and configuration of a stateful resource. Resource management functions of a resource may also control other resources—for example, a resource that acts as a resource manager may offer a service to create/provision a new instance of a certain other resource. The described view on the management capabilities of resources is depicted as "Systems Management Layer" in FIG. 1. This layer summarizes the management interfaces of the resources.

In order to perform systems management in the scope of a whole IT Service Environment (in contrast to single resources) an integration of single Systems Management Tasks into a systems-wide Systems Management Flow is necessary in order to treat the IT Service Environment as a whole and to keep it in a consistent state (see also layer "Systems Management Flows" in FIG. 1). Thus Systems Management Flows play a key role for the management of IT Services.

As an example for a Systems Management Flow, let us assume that a new server WebServer3 has to be provisioned as depicted in FIG. 2. The related simplified Systems Management Flow could contain following Tasks (the following list first mentions the resources that perform the Tasks followed by a brief description of the Tasks):

Cluster1: task install and start image: get a new server from the server free pool and name it WebServer3; load and install a system image that contains an operating system and a web server application on WebServer3 from an image management system; reboot WebServer3; add a relationship from Cluster1 to WebServer3

WebServer3: task initial application start: register at name server; start web server application LoadBalancer: task register web server: add host name and IP-address of WebServer3 to the list of available web servers for load balancing There are various techniques available for implementing Systems Management Flows as described in chapter "Prior Art".

Initial Problem

Systems Management Flows can change when the underlying IT system changes. The more features, combinations of features, and different implementations of features a management solution offers, the more different Systems Management Flows must be defined and handled. There is a potentially large number of different Systems Management Flows required due to the quickly growing number of possible different IT Service Environment definitions. This can be compared to the assembly process in the automotive industry: the more options and accessories are offered for a car (e.g., engine type, transmission, color, wheels, spoilers, etc.) the more complicated the assembly process gets and the more different car configurations can be produced.

Changes of the IT system landscape could require adapting a large part or even all of the Systems Management Flows. Because of the potentially large number and the complexity of Systems Management Flows, administration and maintenance of Systems Management Flow definitions is a demanding challenge.

As discussed above, it is essential to have supporting tools for the creation and management of Systems Management Flows and to automate the execution of Systems Management Flows as far as possible. The next chapter "Prior Art" summarizes existing techniques for this purpose.

Prior Art

At the lowest level, System Management Flows are described by a set of machine-unreadable documents containing lists of System Management Tasks to be performed in a more or less specific way for the operator. This way of implementing Systems Management Flows is error-prone, time consuming, and requires administrators with a broad knowledge for interpreting the documents correctly and to run management tools and other programs with appropriate configuration parameters in the correct sequence.

At the next level, scripts and programs are used to support development and execution of System Management flows. While being very efficient this solution has the drawback that it does not use any standardized way for choreographing multiple tasks.

At a higher level, workflow techniques are used to define and run Systems Management Flows. Workflow techniques integrate several services into an overall flow in a clearly defined and consistent way. An established standard for describing workflows that integrates services having Web Services interfaces is the Business Process Execution Language (BPEL). BPEL descriptions of flows involving several single services can be executed by workflow processing engines (e.g. WebSphere Process Server). There also workflow engines/workflow systems supporting adaptive workflows. Adaptive workflows can be modified by modification operations during their instance life cycle in contrast to static workflow instances as provided by most of the workflow engines (especially, BPEL-engines).

The IBM Tivoli Provisioning Manager (TPM) and the IBM Tivoli Intelligent Orchestrator (TIO) products both automate manual tasks of provisioning and configuring servers and virtual servers, operating systems, middleware, applications, storage and network devices acting as routers, switches, firewalls, and load balancers. Both products contain a deployment engine (DE) which acts as a proprietary workflow engine on entities (resources) which are part of a data center model. One of the features of the DE is the support of the hierarchical workflow/sub-workflow pattern in a very powerful and integrated way.

EP 1636743A1 describes another approach for integrating resource management functions into Systems Management Flows by a so-called resource catalog. The basic idea is that the resource catalog contains resources either being expandable node elements or being leaf elements of a resource tree. The node elements represent composed logical resources (for example, a load balanced web application) which are more and more refined towards the leaf elements which refer to concrete resources, like servers, firewalls, etc. The resource tree is built up in such a manner, that Systems Management Flows are derived from the sequence of the leaf nodes from left to right. The sequence of the leaf nodes and corresponding resource management actions from a resource management actions catalog are compiled to a service environment definition which basically defines a set of flows that can be executed on any workflow engine.

The techniques that have been described in this chapter are also depicted in FIG. 3.

Residual Problems

The technologies mentioned in "Prior Art" already allow for the integration of several systems management tasks into an overall Systems Management Flow. However, these technologies have some pain points.

All mentioned workflow based technologies provide some kind of definition language for specifying workflows. Systems Management Flows can be represented in such systems by corresponding workflow definitions. These definitions describe in which sequence activities are to be executed. So these descriptions are very sensitive to changes in the IT Infrastructure. As stated earlier, there is a potentially large number of different system management flows required. Changes of the IT system landscape could require adapting all or part of the Systems Management Flows. This means that the corresponding workflow definitions must be changed accordingly which results in a complex administration of workflow definitions.

Instead of storing Systems Management Flows directly as workflow definitions, it is desirable to derive Systems Management Flows from a more stable basis that is easier to handle when changes in the IT infrastructure or changes in the offerings of the management solution for the customer occur.

EP 1636743A1 proposes such a strategy, as described in chapter "Prior Art". Changes of the IT infrastructure or changes in the offerings of the management solution for the customer can be handled by simply adding new resources to or modifying resources in the resource catalog and add or modify resource management action definitions. The drawback of the solution is that the changes do not become effective in existing, instantiated service environments. Only new subscriptions can benefit from the changes since the instantiation of the service environment for a subscription is the result of a compilation process that is performed only once at the beginning of a service environment life cycle. The mentioned compilation process includes the creation of the resource tree starting from a root node element, and the derivation of the resulting workflow and the parameter mappings from the resource tree.

OBJECTS OF THE INVENTION

It is object of the present invention to provide a method and system for dynamically creating and modifying resource topologies and executing systems management flows by avoiding disadvantages of the prior art as discussed above.

SUMMARY OF THE INVENTION

The present invention replaces the prior art Systems Management Flow execution environments with a new Order Processing Environment as shown in FIG. 4.

The Order Processing Environment consists of an Order Processing Container ("Container" in short), a Relationship Registry, and a Factory Registry.

The Factory Registry supports creation of new resource instances. The Relationship Registry stores relationships between resources.

The Container gets as input an Order and a start point address for the first resource.

The Order is a document (e.g., XML) which includes a number of Tasks for each involved resource without arranging those tasks in a sequence. This differentiates Orders from workflow descriptions used by standard workflow engines. Each Task includes at least all input parameters for executing the Task. The sequence of the Task execution is derived by the Container by using the Relationship Registry which reflects all current Resource Topologies. In addition to the input parameters each Task may contain a Topology section which describes a new set of relationships and resources that are to be created or deleted.

After having received the Order the Container hands over the Order to the first resource which has been instantiated by a previous Order or by a separate system, e.g. Subscription Registry that creates a subscription resource that reflects a contract with a customer. The first resource reads its related input parameters from the Order and executes the Task by using the System Management components of the System Management Layer, writes output results to the Order as required, and returns the Order to the Container. The Container retrieves the next resource for Order Processing by querying the Relationship Registry, hands over the Order to that resource which in turn executes its related Task, updates the Order and finally hands over the Order to Container again. This procedure is repeated until all resources have processed the Order.

In addition to the definition of the input parameters in the Task description for a resource an Order topology section may be included to define a set of relationships and resources to be created or removed The Container instantiates new resources by using the Factory Registry and adds the new relations to the Relationship Registry.

Separating the flow definition information from the Order, providing the Relationship Registry which reflects the Resource Topology, and deriving System Management flows from the Resource Topology forms a stable basis for modifications of the underlying IT infrastructure without taking notice of the sequence of the Tasks in respective Orders.

DETAILED DESCRIPTION OF THE INVENTION

The following chapters describe Order Processing and all involved components in detail.

Chapter "Resources in the Context of Order Processing" describes how resources are related to Order Processing. The chapter describes their interfaces, roles, and their interactions with the Order Processing Environment.

Chapter "Relations between Resources" describes relations between resources in the context of Order Processing.

Chapter "Structure and Semantics of Orders" describes Orders in detail.

Chapters "Relationship Registry", "Factory Registry", and "Order Processing Container" describe the components of the Order Processing Environment and how they relate to Order Processing.

In the mentioned chapters the term "asynchronous operation" is used. In the context of this invention an asynchronous operation is defined as an operation that immediately returns to the caller of the operation without a result. The called operation is executed later at same point in time. In this sense, implementation examples for asynchronous operations are one-way web service operations, or operations that are called via messages which are delivered by a messaging system like JMS (Java Messaging System).

Resources in the Context of Order Processing

Resources that take part in Order Processing implement the asynchronous operation processOrder. The only parameter of this operation is the Order that is handed over to the resource by the Container. When being called by processOrder the resource interprets the input parameters of its associated Task section in the Order and executes the Task (refer to chapter "Structure and Semantics of Orders" for more details regarding Order structure). A Task can perform any operation. Typically, the resource calls components of the Systems Management Layer in order to fulfill the Task. There is no specification for the interfaces of the components in the Systems Management Layer. The resource has to cover the interfacing by itself, the Order Processing Environment does not provide any support for this issue. While executing the Task, the resource may write results to its Task section in the Order. Finally, the resource calls the Container of the Order Processing Environment by its asynchronous operation delegateOrder and hands over the (updated) Order back again.

Figure 1:
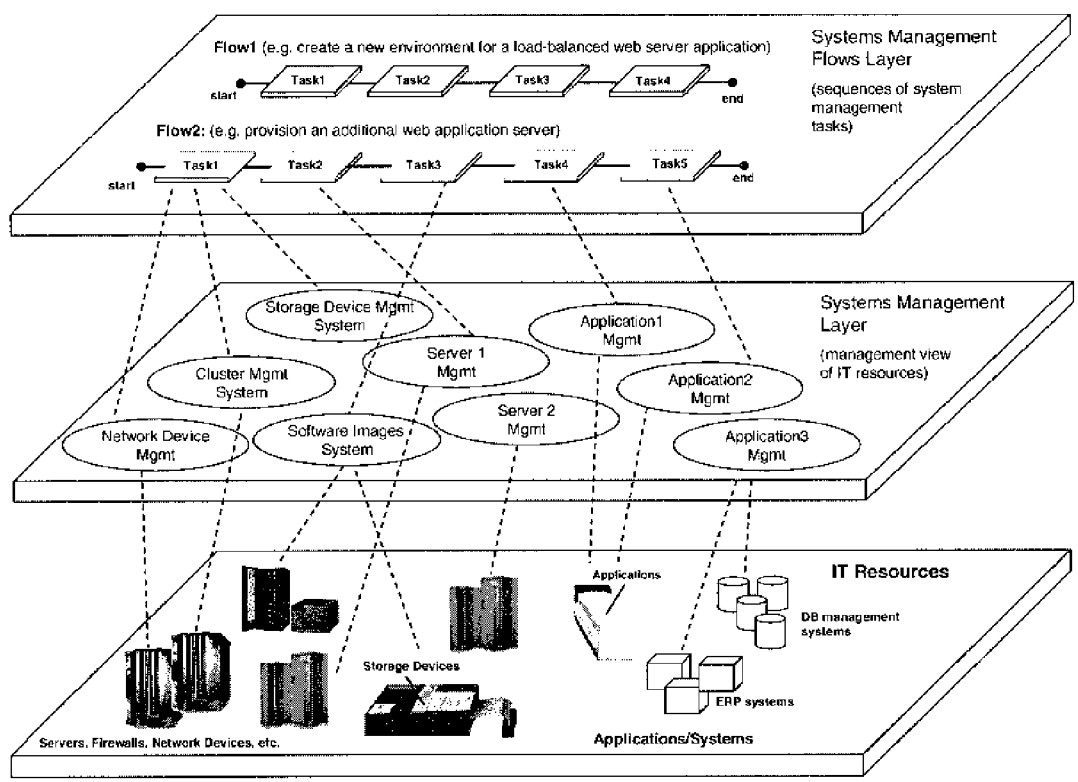
FIG. 1 shows a prior art integration of Resource Management Functions into Systems Management Flows.
Figure 2:
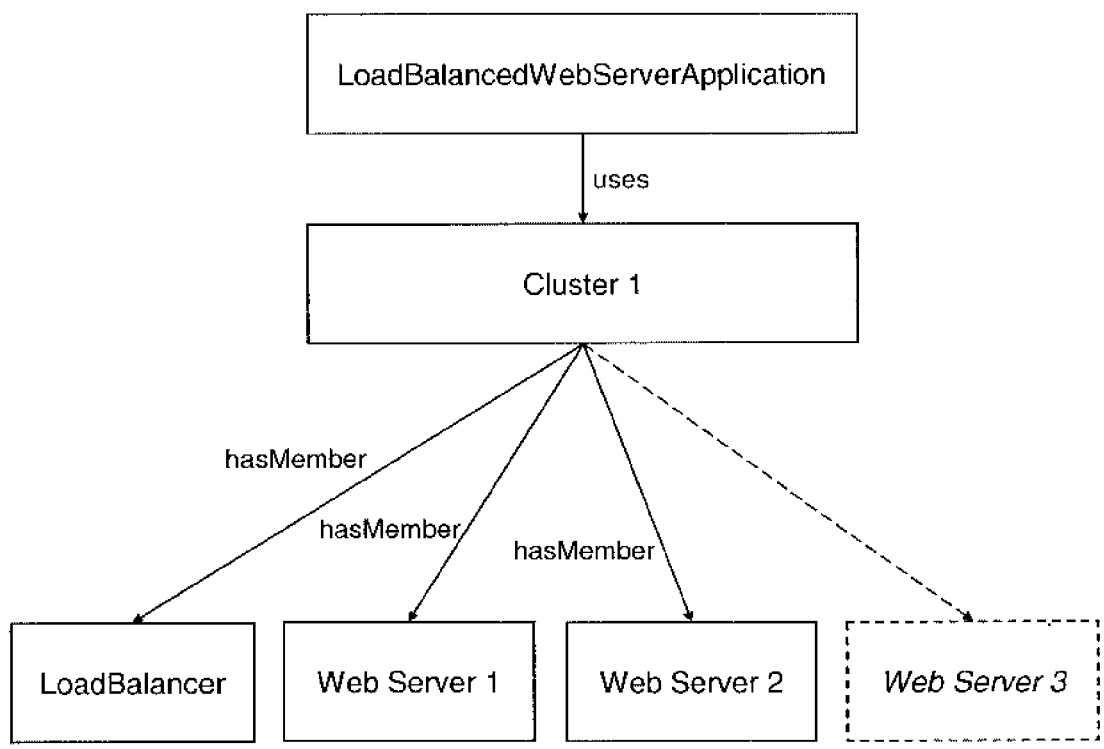
FIG. 2 shows an example of a System Management Flow according to the prior art.
Figure 3:
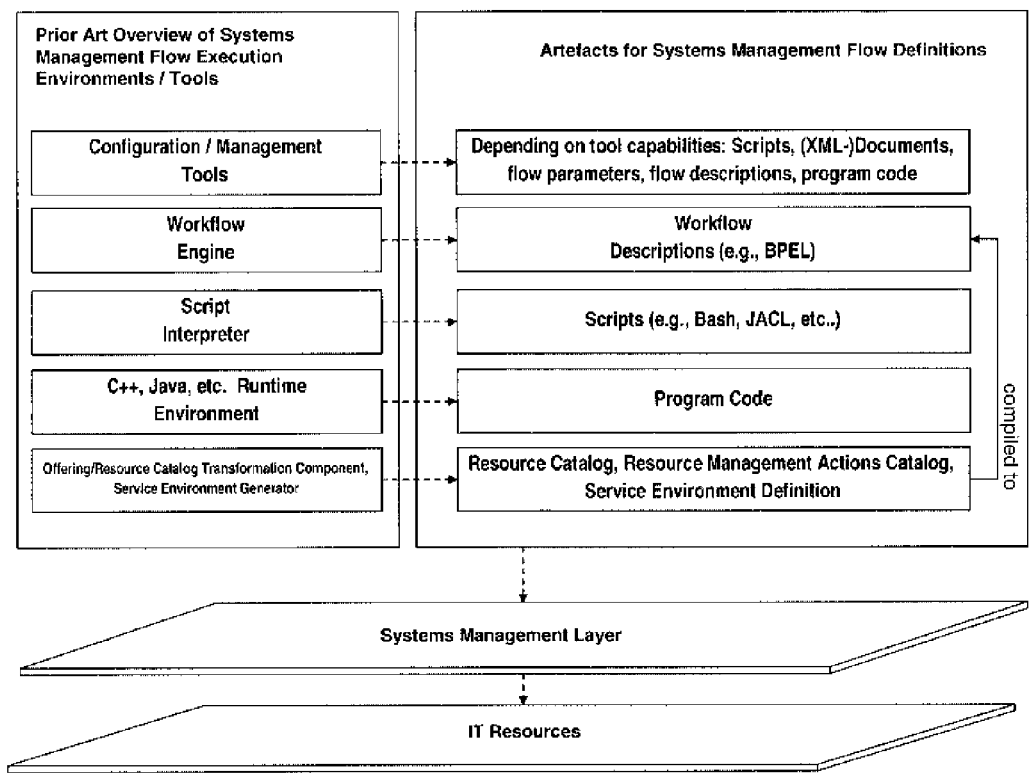
FIG. 3 shows a prior art System Management Flow execution environment.
Figure 4:
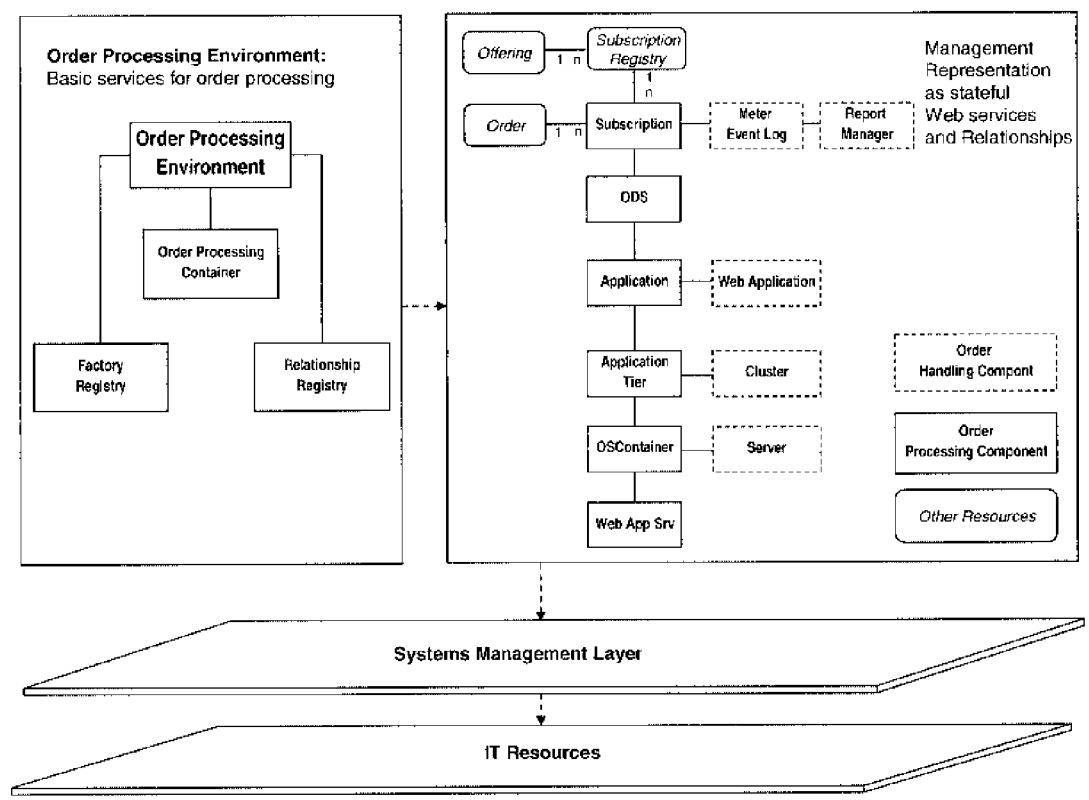
FIG. 4 shows the inventive Order Processing Environment.
Figure 5:
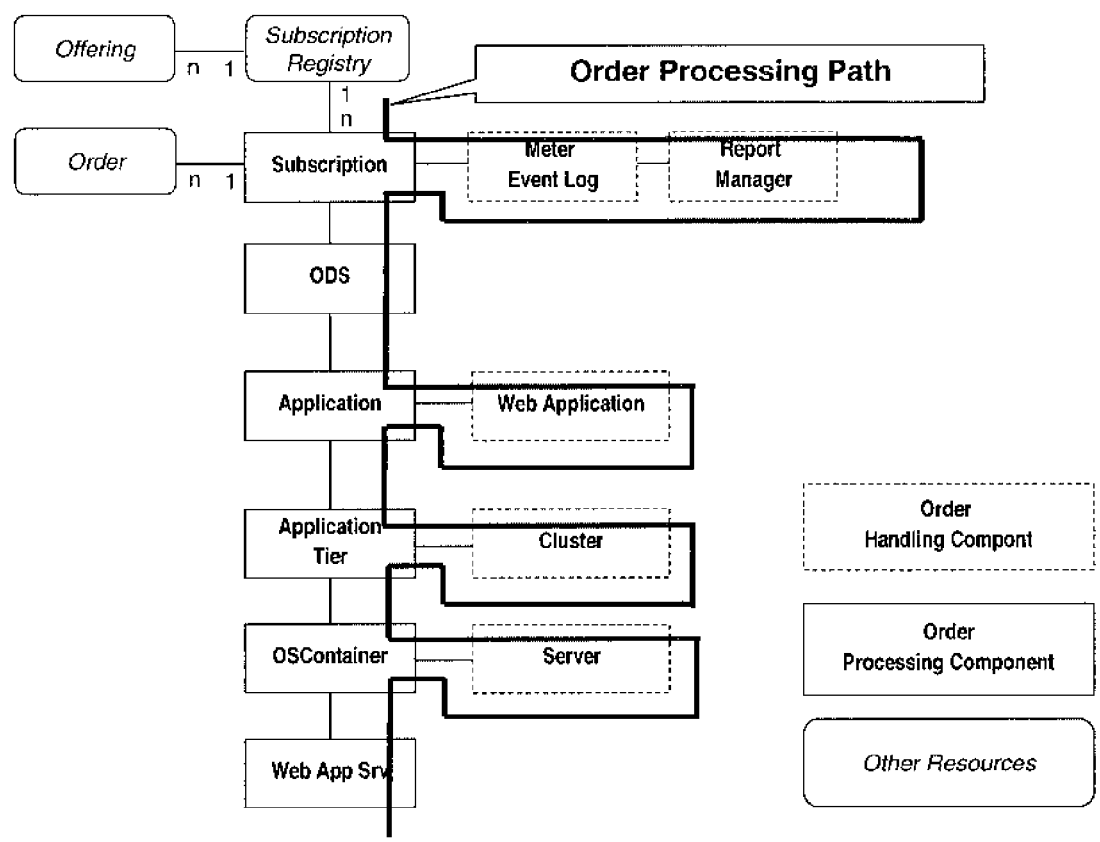
FIG. 5 shows the Order Processing Path as executed by the present invention.

There are two roles defined for resources in the context of Order Processing: role Order Processing Component and role Order Handling Component. Order Processing Components represent the base nodes of the Resource Topology. Each resource with role Order Processing Component has a related chain of resources with role Order Handling Component. Instead of using the terms "resources with role Order Handling Component" and "resources with role Order Processing Component" we simplify our wording and use "Order Handling Components" and "Order Processing Components", respectively, in the following text. The Order Handling Component chain may also be empty for a Order Processing Component. For example, resource Subscription in FIG. 4 has an associated chain of two Order Handling Components (MeterEventLog and ReportManager), resource ODS has no associated Order Handling Components (in other words, the associated chain of Order Handling components is empty for ODS). The Container calls each Order Processing Component before and after all Order Handling Components that are contained in its associated chain. Furthermore, after all resources have been called, the Container reverses Order Processing and calls all resources again that it has called before in reverse order. As a consequence, each Order Processing Component is called four times by the Container by its processOrder operation, while each Order Handling Component resource is called twice by the Container by its processOrder operation. The example in FIG. 5 shall help to clarify the way how Orders are processed. In the example, Order Processing starts at the Subscription resource. The fact that resources get the Order from the Container and hand over the Order back to the Container again after the execution of their associated Task is not shown in FIG. 5. Instead, the sequence of the involved resources that process the order is depicted: the path starts with the Subscription resource that gets the Order handed over from the Container (i.e. the Container calls the processOrder operation of Subscription), processes the Task and returns the Order back again (by calling the delegateOrder operation of the Container). The MeterEventLog resource is the second resource in the path (chapter "Order Processing Container" describes how the Container determines the resources along the processing path). The Container hands over the Order to the MeterEventLog, which in turn processes and then returns the Order back again to the Container. Then the path continues with the ReportManager resource. The Subscription resource is the next resource in the path. This is the second time that the Subscription resource is called by its processOrder operation. Each Order Processing Component is called before and after its related Order Handling Component chain by the Container by its processOrder operation. In contrast to this, each Order Handling Component in the chain is only called once by the Container. The processing path then continues with the ODS resource. Although the Order Handling Component chain of ODS is empty, ODS is called twice (before and after the empty Order Handling Component chain). The path continues with Application, WebApplication, etc. Finally, the path ends up with the WebAppSrv resource. The Container detects the end of the path if it cannot find any related successor resource that it could hand over the Order (see "Order Processing Container" how the Container determines the resources along the processing path). At this point in time the Container reverses the order processing path and calls each resource again that it has called before in reverse order. In the example of FIG. 5, the Container starts the reverse path (which is also called Response Path in contrast to the Request Path that has been discussed so far) with the WebAppSrv resource. The WebAppSrv resource is called twice (before and after its empty Order Handling Component chain). Then the reverse path continues with the OSContainer resource, followed by the Server resource, the OSContainer resource again, the Application Tier resource, etc. The reverse path finally ends up with the Subscription resource. This also ends Order Processing for that Order.

As a result (as mentioned earlier), each Order Processing Component is called four times by the Container by its processOrder operation, while each Order Handling Component is called twice. As a consequence each Order Processing Component can subdivide the execution of its Task into four parts, while each Order Handling Component can subdivide the execution of its Task into two parts. It depends on the purpose of the Order and the individual Task how this subdivision must be done and it is up to the resource developer to make these decisions. Furthermore, all resources must keep an internal state in order to detect how often they have been called by its processOrder operation. There are no hints they get from the Order Processing Environment.

Finally, each resource must implement the operation destroy. This operation is called by the Container when it removes a resource from the Resource Topology. This is the last call the Container performs towards the resource. Then the Container removes the relationship to that resource from the Relationship Registry. From that point on the resource is treated by the Order Processing Environment as being removed and thus not existent. When being called with destroy the resource should remove all of its instance data.

Relations between Resources

Relations between resources are stored in the Relationship Registry component of the Order Processing Environment (refer to chapter "Relationship Registry" for more details). As the term "Relation" indicates, a relation connects two resources with each other in order to reflect a relationship between these resources with regard to the Resource Topology. Each edge in the Resource Topology graph is represented by a relation between two resources.

For the purpose of the present invention, each relation comprises of five attributes:
1. sourceHandle (a Resource Handle pointing to the first resource)
2. targetHandle (a Resource Handle pointing to the second resource)
3. sourceRole (role of the first resource)
4. targetRole (role of the second resource)
5. relationName (optional, can be used as name or stereotype for the relation)

The relation attributes sourceRole and targetRole define the roles of the related resources. There are two roles defined: Order Handling Component (H) and Order Processing Component (P). valid combinations of (sourceRole, targetRole) include (P, P), (P, H), and (H, H). The combination (H, P) is invalid.

Relations are interpreted as directed connections between two resources. The direction of a relation expresses a parent-child relationship between two resources with regard to the underlying Resource Topology. The sourceRole attribute expresses the parent role of the resource that is defined by attribute sourceHandle, while the targetRole attribute expresses the child role of the resource defined by attribute targetHandle. The attribute relationName is optional and has no further purpose in the context of this invention.

In the context of this invention a Resource Handle is a pointer to a resource—either a direct reference to a resource or an indirect reference to a resource that must be resolved into a direct reference (the notion of direct and indirect references is, for example, mentioned in the Global Grid Forum Open Grid Service Infrastructure (OGSI)—direct references are called Grid Service References (GSR), and indirect references are named Grid Service Handles (GSH)). Another example for direct references are End Point References as defined in the WS-Addressing standard. In the context of this invention we assume that Resource Handles are unique for a resource instance so that they can be directly compared for the sake of simplicity of this description. But this does not restrict the generality of this invention. Comparisons, meaning the decision whether two Resource Handles point to the same resource instance, can be enhanced in a straightforward way since stateful resources have a unique resourceId: query the resources for the resourceId where the two Resource Handles point to. Then compare these two values.

Structure and Semantics of Orders

The Order is a document (e.g., XML) which includes a number of tasks for each involved resource without arranging those tasks in a sequence. The Task sequence is derived from the Resource Topology as described in chapter "Order Processing Container". This differentiates Orders from workflow definitions used by standard workflow engines.

There are three types of Orders:
1. Initial Orders
2. Modification orders
3. Termination Orders Initial Orders contain Tasks for building up an initial Resource Topology. Modification Orders can be processed on Resource Topologies that have been initialized by an Initial Order (e.g., a Modification Order includes Tasks for provisioning a new server to the existing system). A Termination Order is the last Order that can be applied to a Resource Topology. The purpose of this Order is to terminate all management actions, to clean up any storage that keeps state information which is not required anymore, and then remove all resources of a given Resource Topology.

In addition to the Order type, each Order has an Order name which identifies the specific Order. The resources interpret the Order type and the Order name in addition to their input parameters for deriving the Task that has to be performed. Each resource has an internal list of known Orders, identified by the Order type and the Order name. If a resource is called with an unknown Order then the resource shall perform no action and return the Order immediately to the Container.

Figure 6:
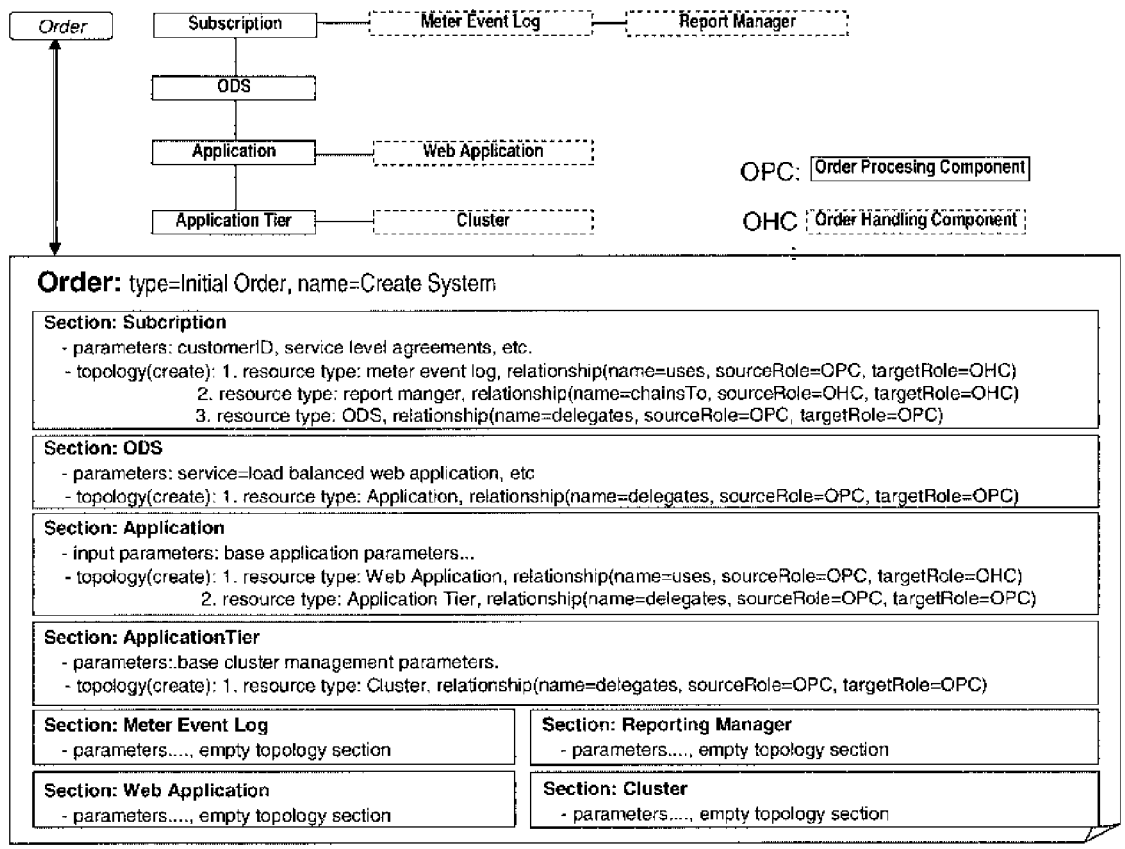
FIG. 6 shows the structure of an initial Order as used by the present invention.

FIG. 6 shows an example of an Initial Order with the Order name "Create System". The Order is intended to build up a base Resource Topology as depicted at the top of the figure. The Order contains eight sections, one for each resource. A resource identifies its associated section in the Order by the section name which is the resource type identifier of the resource (e.g., section Subscription refers to the Subscription resource). Each section in the Order contains two subsections: the parameters subsection and the topology subsection. Both subsections can be empty.

A topology subsection defines a set of relationships and resources to be created or removed from the current Resource Topology starting from the current resource. The topology subsection includes:
1. A hint for the Container whether the mentioned relations and resources are to be created or removed by the values "create" and "remove", respectively.
2. A list of entries, one for each resource and relation that are to be created or removed. Each entry includes: the resource type of the resource that is to be created or removed, and definitions for the relation attributes "name", "sourceRole", and "targetRole".

All relations and resource definitions in a topology subsection of a resource X are interpreted relative to resource X. In the case that the resources and relations of the topology subsection shall be added to the Resource Topology, the topology subsection has following semantics: all listed Order Handling Components are appended via relations to the Order Handling Component chain of resource X in the same sequence as they appear in the list of entries which is mentioned in point 2. above. The listed order Processing Component (if any) is directly connected to resource X via a relation. The mentioned relations are added to the Relationship Registry according to the definitions of the relation attributes in the topology subsection entries. The role of the new resources that are listed in the topology subsection entries is derived from the definition of the corresponding relation attribute targetRole since the listed new resources are always the targets of the relations that are defined in topology subsections.

FIG. 6 shows an example of an Initial Order that contains a section for resource Subscription. The related topology subsection for Subscription is repeated here:

Topology.create: (meaning the topology below is to be created and connected to Subscription)
1. resource type; meter event log, relationship (name=uses, sourceRole=OPC, targetRole=OHC)
2. resource type: report manager, relationship (name=chains, sourceRole=OHC, targetRole=OHC)
3. resource type: ODS, relationship (name=delegates, sourceRole =OPC, targetRole=OPC) with OHC and OPC being short forms for Order Handling Component and Order Processing Component, respectively.

Figure 7:
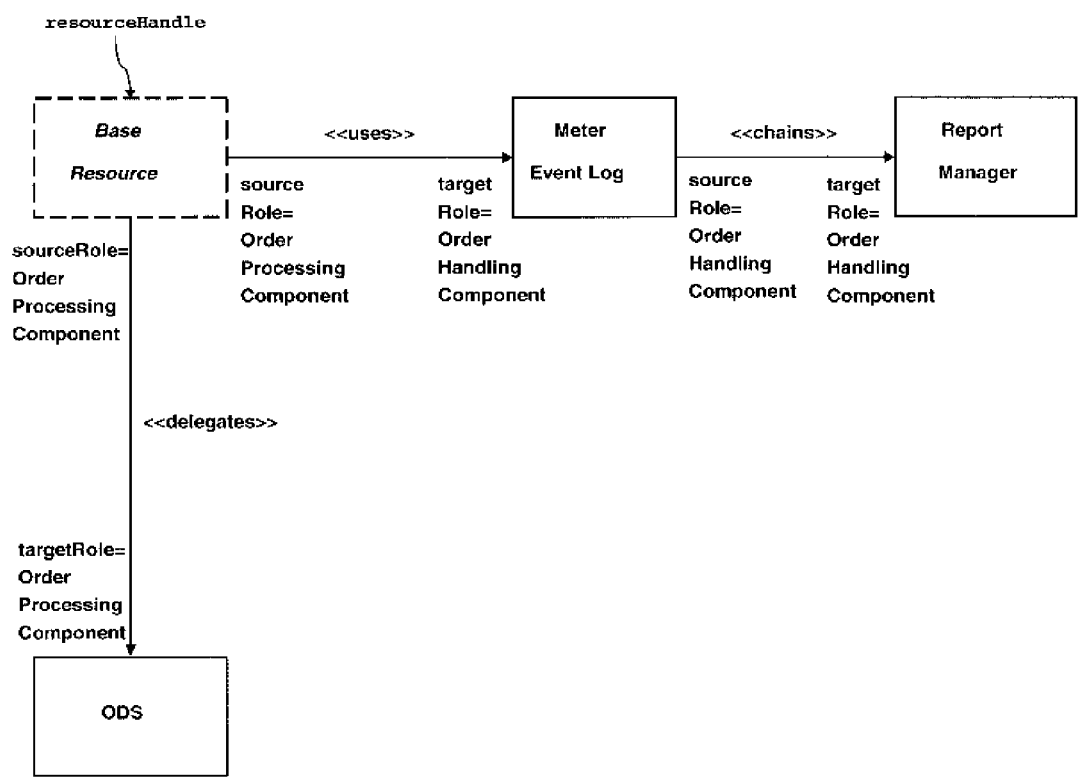
FIG. 7 shows an example of a Topology Subsection as created by the present invention.

The semantics of the mentioned topology subsection example is that three new resources (Meter Event Log, Report Manager, and ODS) are to be created and added to the Subscription resource in the following way:
1. From point 1. in the list above can be derived that Meter Event Log shall act as an Order Handling Component since the relationship targetRole attribute is OHC. So the Meter Event Log will be appended to the Order Handling Component chain of the Subscription resource by a relation with name=uses, sourceRole=Order Processing Component, and targetRole=Order Handling Component, sourceHandle =Resource Handle of Subscription, and targetHandle=Resource Handle of Meter Event Log (see also FIG. 7). Meter Event Log is the first resource in the Order Handling Component chain of Subscription.
2. From point 2. in the list above can be derived that Report Manager shall act as an Order Handling Component since the relationship targetRole attribute is OHC. So the Report Manager will be appended to the Order Handling Component chain of the Subscription resource by a relation with name=uses, sourceRole=Order Processing Component, and targetRole=Order Handling Component. Since Meter Event Log has been listed before Report Manager, the Report Manager will appended to the Meter Event Log, in other words: sourceHandle will point to Meter Event Log, and targetHandle will point to Report Manager (see also FIG. 7).
3. From 3. in the list above can be derived that ODS shall act as an Order Processing Component since the relationship targetRole attribute is OPC. So ODS will be connected directly to the Subscription via a relation with name=delegates, sourceRole=Order Processing, and targetRole=Order Processing Component, sourceHandle=Resource Handle of Subscription, and targetHandle=Resource Handle of ODS (see also FIG. 7).

Topology subsections that refer to removal of resources and relations are indicated by the hint "remove". The Container identifies the existing resources and relations that are to be removed by interpreting the topology subsections in much the same way as described above for creating new resources and relations. Topology sections for removal may have less information for identifying relations and resources as long as the definition of each entry leads to a unique result. Otherwise, the Container flags an error and refuses to apply the topology subsection to the current Resource Topology. Error handling is not part of this invention and is not discussed any further.

Relationship Registry

The Relationship Registry is part of the Order Processing Environment and stores relations between resources. The semantics and structure of relations is described in chapter "Relations between Resources ".

Chapter "Order Processing Container " describes how relations are used for the derivation of correct sequences for Tasks that are contained in Orders—in other words, how relations are used for the step-wise derivation of Systems Management Flows from the underlying Resource Topology while processing an Order.

This chapter summarizes the interface of the Relationship Registry.
addRelationship (relation)
Adds a new relation to its internal storage.
removeRelationships(resourceHandle)
Removes all relations with relation.sourceHandle=resourceHandle or relation.targetHandle=resourceHandle from its internal storage. In the context of this invention we assume that Resource Handles can be compared directly as discussed in chapter "Relations between Resources".
findRelatedTargetsByRole(startHandle,targetRole): ResourceHandle[]
Retrieves all relations that are contained in the internal storage with relation.sourceHandle=startHandle and relation.targetRole=targetRole and returns the value of relation.targetHandle for all relations that have been found as an array of Resource Handles. The length of the array may be zero if no relations can be found for the requested criteria.

Factory Registry

The Factory Registry is part of the Order Processing Environment and stores for each resource type one Resource Handle that points to a resource factory for that resource type. In the context of this invention it is assumed that each resource factory provides a create operation without parameters which instantiates a new resource instance for the given resource type and which returns the Resource Handle of the new resource. In order to take part in Order Processing the new resource must support Order Processing as defined in chapter "Resources in the Context of Order Processing".

Chapter "Order Processing Container" describes the interaction of the Container with the Factory Registry for instantiating new resources.

This chapter summarizes the interface of the Factory Registry.

We define a resource factory as a resource that provides an operation create which creates a new resource instance of a fixed resource type each time when being called. The create operation has no arguments and returns the Resource Handle to the new resource instance that has been created. This can be compared to a simplified view of factories in real life: assume we have a set of car factories where each factory can only produce one model. Compared to this picture the Factory Registry is a list of car factories where each entry contains the location information of the factory and the related model that the factory produces. For ordering a new model X car we query the Factory Registry in order to find out which factory produces this model, go this factory, and finally request the assembly (or "creation ") of a new model X car. If the company decides to add new or remove old car models then the list of factories is updated accordingly. The company could also decide to move production of an existing model to a different factory. This situation can also be handled by simply updating of the factory list.

It should be noted that the create operation of a resource factory creates a resource (more precisely, a management representation of a real IT resource) in an initial state. This resource turns into an active state later when it processes the Initial Order.

The Factory Registry provides following operations:
registerFactory (resourceType, factoryHandle)
Adds a new Resource Handle factoryHandle that points to a resource factory to its internal storage together with the associated resource type resourceType.
deRegisterFactory (resourceType)
Removes the resource factory for resource type resourceType from its internal storage.
getFactoryForResourceType(resourceType): ResourceHandle
This chapter summarizes the interface of the Factory Registry.

Order Processing Container

The Order Processing Container (in short, "Container") is part of the Order Processing Environment and drives Order Processing. Order Processing starts when the Container is called by its asynchronous operation startOrder. It is outside of the scope of this invention how Orders are generated and which system calls the startOrder operation. The startOrder operation has two parameters: the Order and the Resource Handle that points to the first resource in the Resource Topology where Order Processing is to be started. Order Processing always assumes an existing resource acting as an Order Processing Component as the starting point. This resource might be created by earlier Orders or it is created by an external system.

In order to simplify the description of the Container actions, following terms and background information are used:

1. Term: "Container connects resource Y to resource X according to the current topology subsection entry", meaning: the Container adds a new relation as specified by the relation attributes of the topology subsection entry to the Relationship Registry by calling its addRelationship operation. The new relation connects resources X and Y where resource Y is the target resource of the relationship. Topology subsections are described in chapter "Structure and Semantics of Orders".
2. Term: "Container removes resource X from Resource Topology", meaning: the Container calls operation removeRelationships of the Relationship Registry with a Resource Handle that points to resource X in order to remove all relationships with resource X. Then the destroy operation of resource X is called by the Container.
3. Term: "Container instantiates a new resource of resource type T", meaning: the Container queries the Factory Registry for a Resource Handle that points to the resource factory for resource type T by calling the operation getFactoryForResourceType of the Factory Registry. Then the Container calls the create operation of this factory. The create operation creates a new resource instance of resource type T and returns a Resource Handle that points to the new resource.
4. Term: "Container traverses to the next Order Processing Component", meaning: based on a "current" resource X the Container searches for the next resource with role Order Processing Component in the Resource Topology by querying the Relationship Registry with a call findRelatedTargetsByRole and passing a Resource Handle that points to resource X as startHandle parameter for the search and passing role "OrderProcessingComponent" as targetRole parameter. The Relationship Registry responds with an array of Resource Handles that reflects the search result. If exactly one resource is found then the Container treats this resource from now on as "current" resource. Finding no resources is a valid result and is treated by the Container as described in the explanation of the Order Processing loop in the text below. In order to simplify the description of the Container actions it is assumed that if there is more than one resource found then the Resource Topology is treated as being built up incorrectly (see also chapter "Extension of the Order Processing Environment" for dealing with these situations correctly) and the Container would stop Order Processing. Error handling is not part of this invention and is not discussed any further.
5. Term: "Container traverses to the next Order Handling Component", meaning: like point 4 above but using target role "OrderHandlingComponent" instead of using target role "OrderProcessingComponent".

Figure 8:
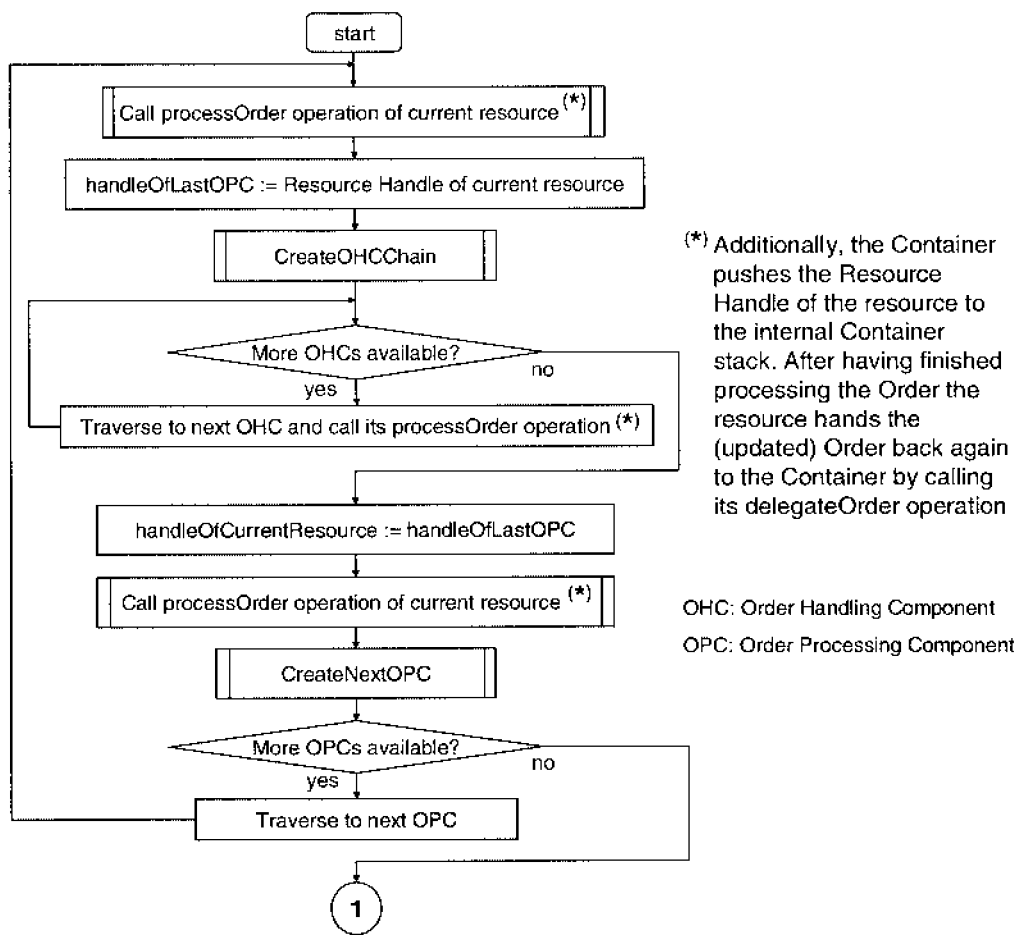
FIG. 8 shows an Order Processing Loop of Container—Request Path—as executed by the present invention.
Figure 9:
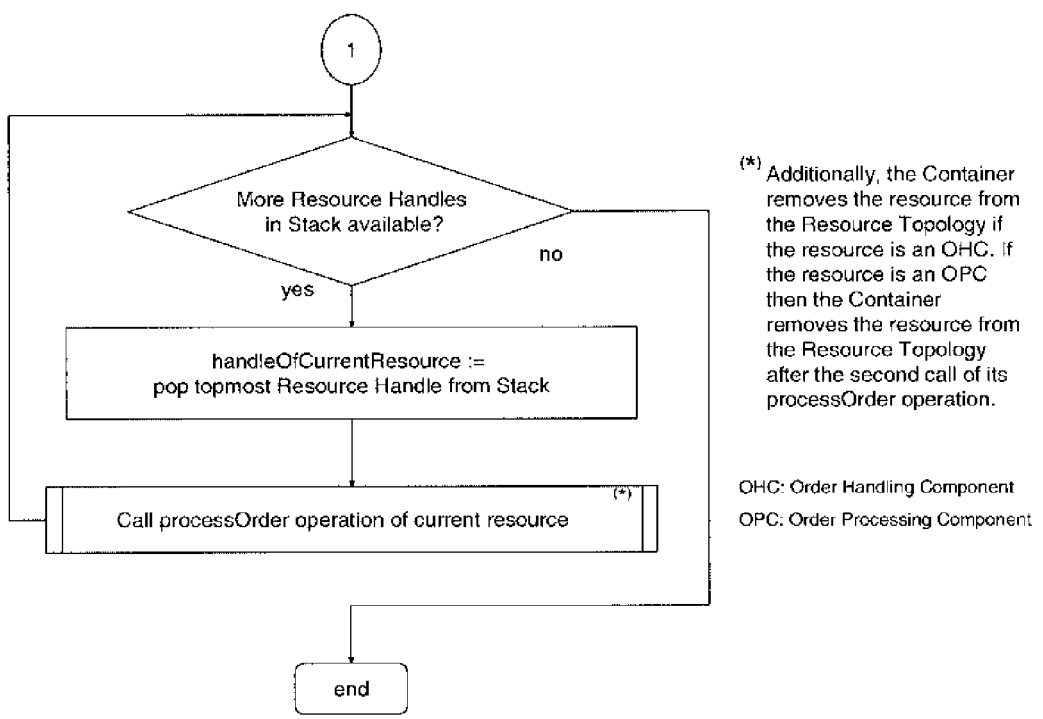
FIG. 9 shows an Order Processing Loop of Container—Response Path—as executed by the present invention.
Figure 10:
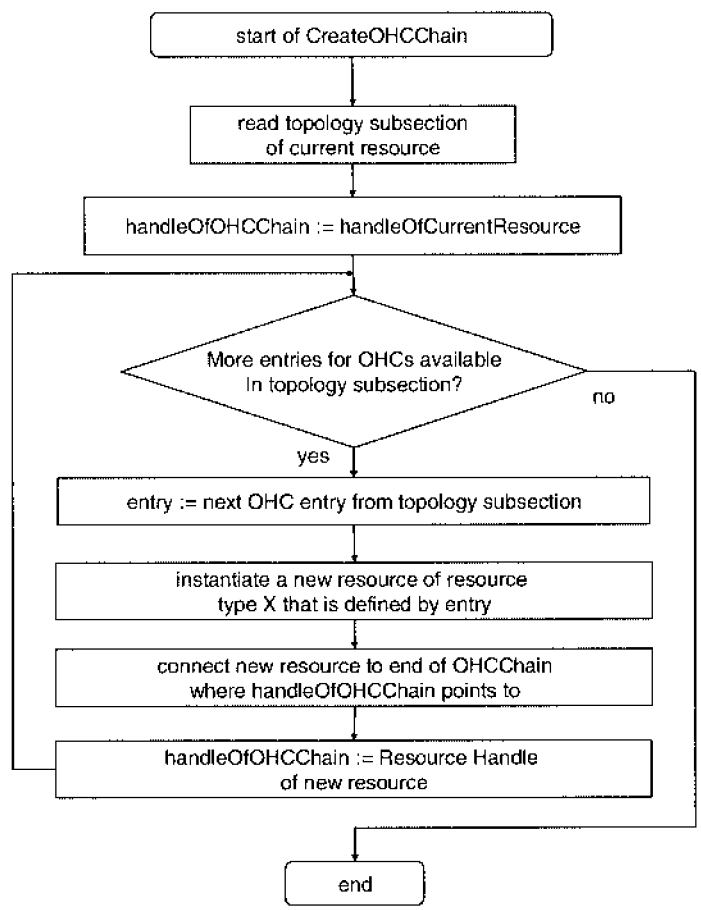
FIG. 10 shows a Subroutine CreateOHC chain as provided by the present invention.
Figure 11:
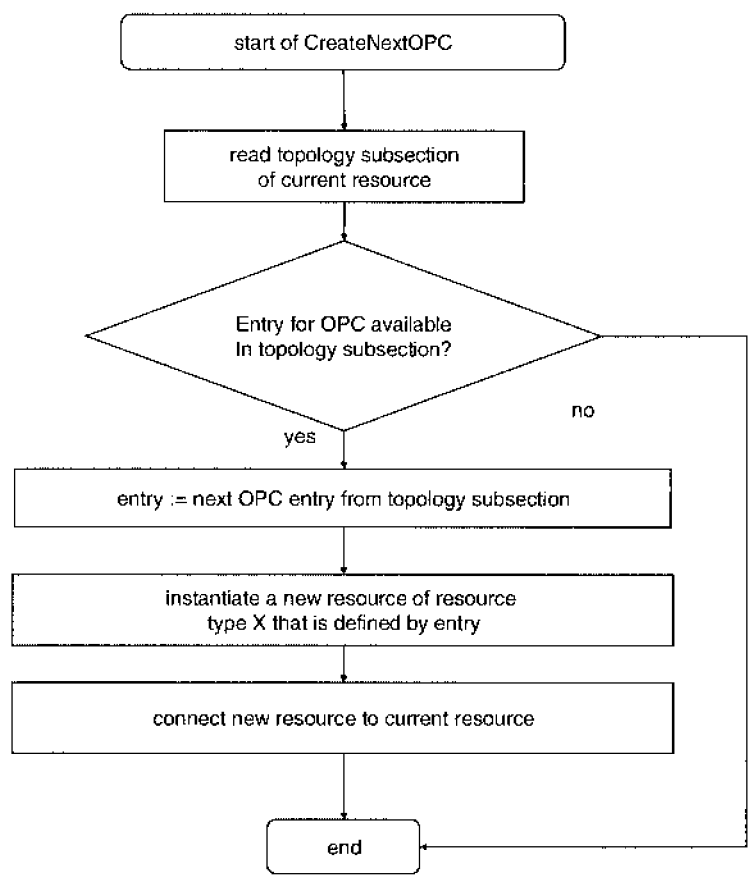
FIG. 11 shows a Subroutine CreateNextOPC as provided by the present invention.

FIGS. 8 to 11 depict the flow charts of the Container actions during Order Processing. Order Processing is started by calling the startOrder operation of the Container with two parameters: the Order that is to be processed and the Resource Handle that points to the first resource in the Resource Topology where Order Processing is to be started. FIG. 8 shows the Request Path and FIG. 9 the Response Path of Order Processing as described in chapter "Resources in the Context of Order Processing". FIGS. 10 and 11 depict the flow charts of subroutines CreateOHCChain and CreatNextOPC, respectively.

Comments to FIG. 8: The flow chart starting point correlates to the call of the startOrder operation of the Container. The Container calls the asynchronous operation processOrder of the current resource (as defined by the Resource Handle parameter of the startOrder operation). The resource in turn processes the Order as described in chapter "Resources in the Context of Order Processing" and finally hands over the (updated) Order back to the Container again by calling its asynchronous operation delegateOrder. This is not depicted in the flow chart—we treat the situation in the flow chart as if processOrder would be a synchronous call that finally returns the (updated) Order. The Container saves the Resource Handle of the current resource now to its variable handleOfLastOPC and then calls the subroutine CreateOHC chain. This subroutine creates and adds all Order Handling Components to the Order Handling Component chain of the current resource. Then the Container traverses to all available Order Handling Components in the Order Handling Component chain and calls their processOrder operations subsequently in the sequence that is given by the Order Handling Component chain. In the next step the Container restores the Resource Handle of the last Order Processing Component that the Container has called before traversing the Order Handling Component chain and treats this resource as the "current" resource. The Container now calls the current resource a second time by its processOrder operation. When finished the Container calls the subroutine CreateNextOPC which connects the next Order Processing Component to the current resource if the Container can find an entry for it in the topology subsection of the current resource and traverses to that resource it has found. Otherwise, if the Container cannot find another Order Processing Component in the topology subsection, the Request Path is terminated. In addition to the described actions, the Container stores the Resource Handle of each called resource into its internal stack. This stack is used during the Response Path for traversing through all resources the Container has called before in reverse order.

Comments to FIG. 9: this flow chart depicts the Container actions for processing the Response Path of Order Processing. The Container queries its internal stack for traversing through all resources the Container has called before in reverse order. In each iteration of the loop the topmost stack entry is read and removed from the stack. The stack contains the Resource Handles of all the resources that have been called in the Request Path. The fact that each Order Processing Component has been called twice during the Request Path is reflected accordingly by two stack entries for Order Handling Components (one before and the other after the entries for the Resource Handles of the resources of the Order Handling Component chain).

Comments to FIG. 10: This flow chart depicts the actions of subroutine CreateOHCChain for building up the Order Handling Component chain for the current resource which is always an Order Processing Component. The Container instantiates and then connects the Order Handling Components to the last Order Handling Component in the chain (or directly to the current resource at the beginning) according to the entries in the topology subsection of the current resource.

Comments to FIG. 11: This flow chart depicts the actions of subroutine CreateNextOPC. The Container reads the topology section of the current resource which is always an Order Processing Component. If the Container finds on entry for a new Order Processing Component then the Container instantiates the Order Processing Component according to the topology subsection entry for that component and connects it to the current resource. At the end of the Request Path the Container will not find a next Order Processing Component in the topology section of the current resource anymore.

Extension of the Order Processing Environment

In order to keep the description of the Order Processing Environment simple we made the restriction that branching points in the Resource Topology where more than one Order Processing Component is connected to another Order Processing Component are not allowed. This is an unacceptable restriction for real applications which is resolved in this chapter.

In order to allow for the mentioned branching points, the delegateorder operation of the Container is enhanced by an additional parameter targetOPCHandle which is set by the resource that calls the operation and which determines the next resource to be called by the Container for Order Processing. In that manner, a resource can determine where to go next at a branching point. Only resources that are Order Processing Components are allowed to redirect Order Processing to other Order Processing Components in this way. If the new parameter targetOPCHandle is left empty, then delegateOrder acts as before.

Furthermore, the Container functionality is enhanced in the following way: if the Order Processing is already processing the Response Path, then a call of delegateOrder with a defined Resource Handle for targetOPCHandle instructs the Container to switch back to the Request Path traversal mode again and to traverse the new path starting with the resource where targetOPCHandle points to. In this manner, Order Processing can traverse through multiple sub-paths starting from a branching point.

Additionally, Order Processing can also "jump" from one resource to another (even if they are not related in the Resource Topology) since targetOPCHandle can be any Order Handling Component in the Resource Topology.

As a further extension of the Order Processing Environment two additional operations are added to the Container: createTopology and deleteTopology. These two operations enable resources to instruct the Container to modify the Resource Topology. For this purpose, the structure of the Order is extended by allowing topology sections to be defined outside of the resource-specific Task sections in the Order. Each of these topology sections is marked with an individual identifier that differs from section names of resource-specific Task sections. The structure and semantics of this new kind of topology sections is the same as the structure and semantics of the known topology subsections for resources.

The signatures of the new Container operations are as follows:

createTopology(baseHandle, topologySectionName, Order)
deleteTopology(baseHandle, topologySectionName, Order)

The first parameter baseHandle points to the resource that shall be taken as the base node for topology modification (create or delete). The parameter topologySectionName defines the topology section in the Order to be used. The last parameter is the Order.

| Glossary | |
|---|---|
| IT Service Environment | collection of resources and a set of behavioral conditions that altogether define a specific IT service |
| IT Service | A service in the context of information technology, e.g. providing an ERP system to an external customer |
| Systems Management Task | A logical and/or functional unit that performs some action in the context of underlying IT Service Environments. System Management Tasks may refer to one or more resource management functions. |
| Task | Short form for Systems management task |
| Systems Management Flow | A sequence of Tasks. |
| Order | The Order is a document (e.g., XML) which includes a number of tasks for each involved resource without arranging those tasks in a sequence. This differentiates Orders from workflow descriptions used by standard workflow engines. |
| OrderID | A unique ID that is assigned to an instance of an Order when being processed. |
| Order Document | A document (preferably in XML) that represents an order instance |
| Order Document Section | One section within the Order Document containing information for one specific Task. During Order Processing (see below) the respective Task reads its required input data from its section in the Order Document and writes back response data to this section. |
| Order Processing | The processing of an Order Document by the Container and Tasks. During processing the Order Document is passed from resource to resource; during transitions between two consecutive resources in the Systems Management Flow the Order Document is passed to the Container. |
| Systems Management Flow Execution Container | An environment for executing Systems Management Flows based on the resource topology, on the information in the Order Document, and on the responses of the involved resources. |
| Container | Short form for Order Processing Container |
| Resource Topology | A set of resource instances and relations between these resource instances with the primary purpose of reflecting the underlying instantiated IT Service Environment. |
| Resource Handle | A pointer to a resource - either a direct reference to a resource or an indirect |

-continued

| Glossary |
|---|
| reference to a resource that must be resolved into a direct reference (the notion of direct and indirect references is, for example, mentioned in the Global Grid Forum Open Grid Service Infrastructure (OGSI) - direct references are called Grid Service References (GSR), and indirect references are named Grid Service Handles (GSH)). Another example for direct references are End Point References as defined in the WS-Addressing standard. |

What is claimed is:

1. A computer-implemented method for dynamically creating and/or modifying resource topologies including a state of the contained resources, wherein said method is being executed in an order-processing environment, wherein said order-processing environment includes at least an order-processing container and relationship registry that stores relationships between resources, and an order which is being processed by said order-processing container, wherein said order includes a number of resource-specific tasks without arranging those in a sequence, wherein said tasks provide actions for creating and/or modifying resource topologies, wherein said each task is assigned at least input parameters for execution of said task and optionally includes topology information which describes a new set of relationships and resources that are to be created or deleted, wherein said method comprises the steps of:
  a) providing access to an order by said order-processing container,
  b) providing said order to a first instantiated resource which forms part of a resource topology to be created or to be modified by said order,
  c) deriving the assigned task from said order by said first resource,
  d) reading the input parameters from said assigned task by said first resource,
  e) executing said task by using said assigned parameters by said first resource, generating an output that is written to said order,
  f) inputting said order to said order-processing container by said first resource, wherein said order is a number of tasks for each involved resource without arranging said tasks in a sequence, wherein said order is updated with said output prior to returning said order,
  g) querying said relationship registry for resources which have a relationship to said first resource by said order-processing container,
  h) providing said order to one of said resources which have a relationship to said first resource,
  i) repeating said steps b)-g) for said resource determined by step h).

2. The method according to claim 1, wherein said order-processing environment further includes a factory registry providing resource-specific resource factories for creating new resource instances, said method comprises the further steps if topology information is available for said task:
  after receiving said order from each called resource deriving resources to be created from topology information assigned to said called resources,
  querying said factory registry for resource specific resource factories by said order-processing container,
  instructing said resource specific resource factory for creating new resource instances by said order-processing container,
  connecting said new resource instances to said resource topology by order-processing container.

3. The method according to claim 1, wherein each resource being part of the resource topology and being part of the order processing provides an interface for communication with said order-processing container and means for interpreting said orders.

4. The method according claim 1, wherein said order includes information for creation or determination of the start point for order processing.

5. The method according to claim 1, wherein said order-processing container provides methods for creating and deleting topologies which can be accessed directly by said instantiated resources.

6. A computer program product stored on computer usable medium comprising readable program means for causing a computer to perform the method of claim 1, when said computer program is executed on a computer.

7. A system for dynamically creating and/or modifying resource topologies including a state of the contained resources, wherein said system is an order-processing environment, wherein said order-processing environment includes a processor having at least an order-processing container and relationship registry that stores relationships between resources, and an order which is being processed by said order-processing container, wherein said order includes a number of resource-specific tasks without arranging those in a sequence, wherein said tasks provides actions for creating and/or modifying resource topologies, wherein said each task is assigned at least input parameters for execution of said task and optionally includes topology information which describes a new set of relationships and resources that are to be created or deleted, wherein said system comprises a processor means of:
  a) means for providing access to an order by said order-processing container,
  b) means for providing said order to a first instantiated resource which forms part of a resource topology to be created or to be modified by said order,
  c) means for deriving the assigned task from said order by said first resource,
  d) means for reading the input parameters from said assigned task by said first resource,
  e) means for executing said task by using said assigned parameters by said first resource, generating an output that is written to said order,
  f) means for inputting said order to said order-processing container by said first resource, wherein said order is a number of tasks for each involved resource without arranging said tasks in a sequence, wherein said order is updated with said output prior to returning said order,
  g) means for querying said relationship registry for resources which have a relationship to said first resource by said order-processing container,
  h) means for providing said order to one of said resources which have a relationship to said first resource,
  i) means for repeating said methods executed by said means b)-g) for said resource determined by said means h).

8. The system according to claim 7, wherein said order-processing environment further includes a factory registry providing resource-specific resource factories for creating new resource instances, and said order further comprises topology information for at least one of said task:

means for deriving resources to be created from topology information assigned to said called resources after receiving said order from each called resource, means for querying said factory registry for resource specific resource factories by said order-processing container, means for instructing said resource specific resource factory for creating new resource instances by said order-processing container, means for connecting said new resource instances to said resource topology by said order-processing container.

9. The system according to claim 7, wherein each resource being part of the resource topology and being part of the order processing provides an interface for communication with said order-processing container and means for interpreting said orders.

10. The system according claim 7, wherein said order includes information for creation or determination of the start point for order processing.

11. A computer program for execution in a data processing system for creating and/or modifying resource topologies including a state of the contained resources, wherein said computer program is being executed in an order-processing environment, wherein said order-processing environment includes at least an order-processing container and relationship registry that stores relationships between resources, and an order which is being processed by said order-processing container, wherein said order includes a number of resource-specific tasks without arranging those in a sequence, wherein said tasks provides actions for creating and/or modifying resource topologies, wherein said each task is assigned at least input parameters for execution of said task and optionally includes topology information which describes a new set of relationships and resources that are to be created or deleted, wherein said computer programs performs the steps of:

a) providing access to an order by said order-processing container, b) providing said order to a first instantiated resource which forms part of a resource topology to be created or to be modified by said order, c) deriving the assigned task from said order by said first resource, d) reading the input parameters from said assigned task by said first resource, e) executing said task by using said assigned parameters by said first resource, generating an output that is written to said order, f) inputting said order to said order-processing container by said first resource, wherein said order is a number of tasks for each involved resource without arranging said tasks in a sequence, wherein said order is updated with said output prior to returning said order, g) querying said relationship registry for resources which have a relationship to said first resource by said order-processing container, h) providing said order to one of said resources which have a relationship to said first resource, i) repeating said steps b)-g) for said resource determined by step h).

* * * * *